Figure 1:
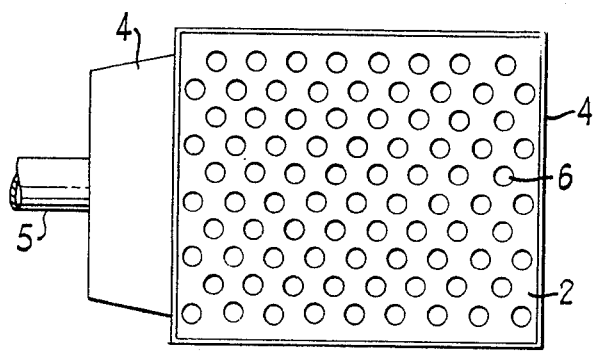

United States Patent [19]

Ravault

[11] 3,877,973
[45] Apr. 15, 1975

[54] TREATMENT OF PERMEABLE MATERIALS

[75] Inventor: Frank Ernest George Ravault, Nechells, Birmingham, England

[73] Assignee: Foseco International Limited, Birmingham, England

[22] Filed: Dec. 29, 1972

[21] Appl. No.: 319,765

[30] Foreign Application Priority Data
Jan. 14, 1972 United Kingdom............... 1931/72

[52] U.S. Cl. .................. 264/44; 264/59; 264/46; 264/60; 264/62
[51] Int. Cl............................................. B44d 1/092
[58] Field of Search.......... 117/98, 125, 70 A, 70 B, 117/40, 46 CA, 46 CC; 264/60, 59, 62

[56] References Cited
UNITED STATES PATENTS

| | | | |
|---|---|---|---|
| 3,047,418 | 7/1962 | Compton | 117/40 X |
| 3,090,094 | 5/1963 | Schwartzwalder et al. | 264/44 |
| 3,451,841 | 6/1969 | Kesten et al. | 117/98 X |
| 3,505,158 | 4/1970 | Murray | 264/60 X |
| 3,511,689 | 5/1970 | Winkler | 117/98 X |
| 3,536,480 | 10/1970 | Winkler | 117/46 X |
| 3,671,302 | 6/1972 | Nell et al. | 117/125 X |

FOREIGN PATENTS OR APPLICATIONS

| | | | |
|---|---|---|---|
| 1,936,888 | 1/1971 | Germany | 117/125 |
| 42-3889 | 6/1967 | Japan | 117/125 |

*Primary Examiner*—William D. Martin
*Assistant Examiner*—Stuart D. Frenkel
*Attorney, Agent, or Firm*—Cushman, Darby & Cushman

[57] ABSTRACT

A method of making an article of highly permeable material having on at least one surface of the article an impermeable facing layer, said method comprising: forming a pattern of organic foam material; lining a surface of the organic foam material with a layer of absorbent material; impregnating the pattern and lining with a liquid slurry of ceramic material; removing surplus slurry and drying and heating the assembly to form a ceramic foam article of large-celled structure and high permeability having a layer of fine-pored structure on the surface corresponding to the surface of the organic foam which was lined with absorbent material; applying a glazing frit to the layer of fine-pored structure; and heating to cause the frit to fuse to produce an impermeable facing.

7 Claims, 2 Drawing Figures

TREATMENT OF PERMEABLE MATERIALS

This invention relates to the treatment of permeable materials.

There are many areas of technology in which it is desired to provide an impermeable surface layer on an internal or external surface of a permeable material. In many cases, this can be effected easily by the application of a suitable coating, but there are occasions when, because of the nature of the permeable material, coating becomes impractical. This is particularly the case in the area of coating foam-structured materials. There is a tendency for coating materials not to form a coating on the surface but rather to become absorbed into the material.

One specific area of technology where this problem is particularly severe is the field of foam-structured ceramic materials. If these are to be provided with an impermeable surface layer, then the layer should advantageously be refractory and ceramic in order that it may remain useful under all conditions of use of the foam ceramic material. Glazes are excellent materials for fulfilling the required properties but are all too easily absorbed into the porous foam during application.

According to the present invention there is provided a method of making a highly permeable material having at least one surface faced with an impermeable layer which comprises providing a coherent fine-pored layer on the surface of the highly permeable material, applying a fusible coating material to the coherent fine-pored layer and drying and firing the assembly so made to a temperature at which the fusible coating material forms a continuous impermeable layer.

The coherent fine-pored layer may be formed, for example, by coating or lining a surface of the highly permeable material with an absorbent material, depositing on the absorbent material a layer of particulate material and then heating. Alternatively, a fibrous slurry may be filtered through a coarse-pored material to form a fibrous layer at one face, and the fibrous layer treated with a ceramic slip and then heated.

The fusible coating material is preferably a glaze-forming material of known type. A wide range of glaze-forming materials are available and the user may select those having the appropriate fusing temperature and thermal expansion characteristics without difficulties.

The method of facing according to this invention may be used to face the outsides of permeable articles or to line channels or apertures in the interior therof. The method is of wide application, though as mentioned above, it is of particular value in connection with porous foam structured ceramic materials, in which connection, it will now be more specifically described:

Methods of making porous ceramic materials are described in British Patent Specification Nos. 923,862; 916,784; 1,004,352; 1,019,807; 1,054,421. In these methods the general procedure is to take a body of porous organic foam material, e.g., polyurethane foam, impregnate the foam with a slurry of finely divided ceramic material, usually in water, and finally dry and fire the so-obtained structure. The organic foam disappears on firing to leave a ceramic structure. In order to ensure coherence the slurry may contain a binder such as a clay, a phosphate or sodium silicate.

Owing to the relatively large-celled structure of these materials, it is not convenient or in some instances not possible to seal their surfaces by means of normal glazing techniques such as those used, for example, in the manufacture of glazed ceramic bodies such as decorated porcelains, since when the glaze fuses it becomes distributed with the surface of the body without necessarily effecting a seal.

In this invention, the surfaces to be glazed are first provided with a fine-pored structure which subsequently provides a suitable substrate on which the glaze deposits as a thick layer. On firing, an impermeable surface is formed.

The channels and/or other surfaces on which the glaze is to be deposited are formed in the original organic foam master by any appropriate means, and may then be coated or lined with a layer of absorbent material, for example, unsized paper or ceramic fibre, formed to the shape of the surface or channel. This absorbent layer may be fabricated separately to the desired shape and then inserted into or placed on (as appropriate) the original foam master, or it may be formed in situ by introducing a slurry of fibres dispersed in a suitable vehicle (for example, water) to the surfaces and into the channels which are intended to be lined. A suitable binder may if desired be incorporated in the slurry. In some instances the capillary pull of the foam on the slurry vehicle, or the effect of gravity in conjunction with the porosity of the foam, may be sufficient to dewater the slurry and lead to the formation of a coherent fibrous mat, but the process may be aided by the application of pressure to the slurry, or, preferably, by the application of a vacuum to those surfaces of the organic foam body which are not intended to be glazed in the final article. Once the coherent fibrous layer has been formed on the surface of the foam body, surplus slurry is drained away and the body is dried, preferably by microwave heating.

The body thus formed may be converted into a ceramic replica by the methods decribed in the specifications noted above. At the stage when the body is immersed in a ceramic slip, slurry fines are induced to build up on the absorbent layers by the capillary action of this absorbent material, and after drying and firing form an adequately dense substrate to carry a glaze.

In an alternative procedure, the ceramic replica of an organic foam, provided where desired with surfaces or channels to be glazed, is first made by the methods just noted, and only then are the surfaces or channels to be glazed provided with an absorbent layer of organic and/or inorganic fibres by any of the methods noted above and the layer dried. The whole body is then dipped into a ceramic slip, preferably of the same composition as that used to produce the body, allowed to drain, dried and fired. Obviously this alternative procedure involves an extra firing stage, which may not be desirable from the point of view of cost.

The body produced by either of the methods described above is then glazed, preferably as follows: The areas of the body which are not to be glazed are masked off with grease, masking tape, rubber solution or like masking material. Glazing frit is then applied, preferably from an aqueous slurry into which the body is immersed. More than one glaze coat may be applied if desired, and two or more different glaze compositions may be employed if, for example, there is a difference in the thermal expansion characteristics of the porous ceramic material and of the sealing layer of the glaze or if there is a risk that the glaze may have a deleterious chemical reaction with the porous ceramic substrate. The body is then re-fired to a temperature sufficient to cause the glaze to sinter and fuse to produce the desired impermeable layer on the treated surface.

As an example of a specific application of the method of this invention, the gas burner is illustrative:

Known porous ceramic material gas burners are merely of a type in which a mixture of inflammable gas and air or oxygen is passed through a block of the material and burns on one face thereof. These burners are of restricted use since the inflammable mixture must be supplied to the burner block at a pressure greater than atmospheric pressure. Whilst mains gas pressure is adequate for this purpose, air under pressure must be supplied by a fan or pump which limits the usefulness of these burners. Of far wider use are gas burners in which the air for combustion is employed at atmospheric pressure. Heretofore, these have not been satisfactorily made of porous ceramic material.

Using the methods of the present invention it is possible to make a gas burner block which comprises a block of porous ceramic material sealed on at least one face, means for feeding gas to the body of the block, and a plurality of tubes leading from the sealed face of the block through the block and opening onto the opposite (unsealed) face, the walls of the tubes being impermeable. Such a gas burner block is novel and forms a further feature of this invention.

In use, the burner block is arranged with the tubes vertical and its sealed face downwardly. Gas is fed into the body of the block and emerges on the upper face where it mingles with air coming up the tubes to give a smooth combustion. Preferably in order to aid distribution of the gas in the block, the majority of the block is made of a very highly permeable porous ceramic material. However, in order to give a satisfactory burner face, the face of the block opposite the sealed face is preferably of fairly fine structure and of lower permeability accordingly. Preferably the permeability of the material of the body of the burner is at least three times that of the burner face.

The combustible gas is preferably fed to the block via a manifold encircling the block and sealingly affixed thereto.

The preferred mode of sealing the face opposite the burner face and the side walls of the tubes is by the method of the invention defined above, by depositing a coating of glaze on those surfaces. Since the surfaces are of a very porous nature, it is not possible simply to glaze those surfaces. According to the method of this invention therefore, the surfaces to be glazed are first provided with a fine structured layer. This layer acts during glaze dipping as a fine substrate on which the glaze deposits as a thick layer. On firing an impermeable surface is formed.

The burner block is made by forming a master in organic foam material, impregnating with a slurry of finely divided ceramic material and drying and firing the shape to form a ceramic burner block. The holes should, of course, be present in the original master, which preferably consists of a thick layer of coarse very permeable organic foam between two thin layers of fine-structured small-cell foam, one of which forms the burner face and the other the impermeable face (when glazed). The three layers may be held together simply by assembling them and punching the holes through with rods electrically heated to controlled temperatures. The heat in the rod welds the foam together adequately. In order to provide a fine-structured surface in the tubes, these may be lined with an absorbent material, e.g., unsized paper, before impregnation of the master with the slurry. Slurry fines then build up on the absorbent material by capillary action and after drying and firing the tube walls are adequate to prevent glaze solids penetrating them.

Glaze is preferably applied from aqueous slurry by partially dipping the block, burner face uppermost, into the slurry, taking care not to immerse the burner face. During such dipping, parts of the block into which gas is to be fed, should be masked off with grease, masking tape, rubber solution or like masking material. More than one glaze coat may be applied if desired.

Figure 2:
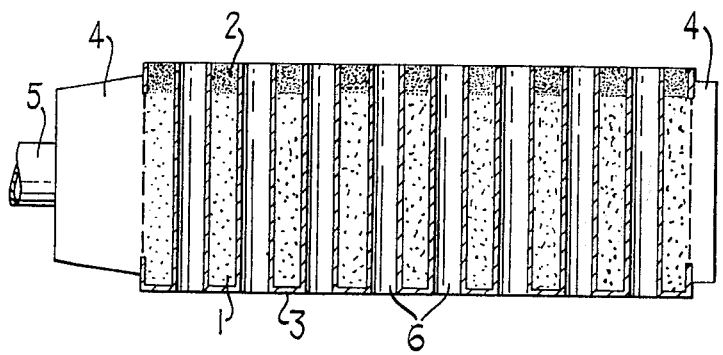

The invention will be further understood from the following more detailed description of an illustrative embodiment taken with the drawings in which:

FIG. 1 is a plan view of a gas burner embodying the principles of the present invention; and FIG. 2 is a sectional view of the burner of FIG. 1. Referring to the drawings, a gas burner consists of a block of highly permeable porous ceramic material 1 faced on its upper side by a layer of less permeable porous ceramic 2 and round its base and lower sides by a glaze layer 3. Around the block sides is a gas manifold 4 provided with a gas inlet 5.

The block is crossed by a triangular array of channels 6, the inside wall of each being glazed. The glaze coating was formed as follows:

The block was dipped into an aqueous slurry having a composition, by weight:

| | |
|---|---|
| Micronized Alumina | 16% |
| Sodium Silicate (SiO$_2$:Na$_2$O 2:1 48% by weight sodium silicate solids) | 12% |
| Zircon frit | 12% |
| Water | 60% |

The block was then dried, dipped into a 40 percent by weight aqueous zircon frit slurry, dried and fired.

In use, gas flows through tube 5, manifold 4, material 1 and through layer 2 and mixes just above the burner surface with air rising up tubes 6. The combustible mixture so formed burns efficiently, completely and cleanly.

I claim as my invention:

1. A method of making an article of highly permeable material having on at least one surface of the article an impermeable facing layer, said method comprising: forming a pattern of organic foam material; lining a surface of the organic foam material with a layer of absorbent material; impregnating the pattern and lining with a liquid slurry of ceramic material; removing surplus slurry and drying and heating the assembly to form a ceramic foam article of large-celled structure and high permeability having a layer of fine-pored structure on the surface corresponding to the surface of the organic foam which was lined with absorbent material; applying a glazing frit to the layer of fine-pored structure; and heating to cause the frit to fuse to produce an impermeable facing.

2. A method as in claim 1 wherein the step of lining a surface of the organic foam pattern includes applying a slurry of fibres to said surface and removing liquid from the slurry.

3. A method as in claim 1 wherein the step of lining a surface of the organic foam pattern includes applying unsized paper to said surface.

4. A method of making an article of highly permeable material having on at least one surface of the article an impermeable facing layer, said method comprising: forming a pattern of organic foam material; impregnating the pattern with a liquid slurry of ceramic material; removing surplus slurry and drying and heating the assembly to form a ceramic foam article of large-celled structure; lining a surface of the article with a layer of absorbent material; impregnating the article and lining with a liquid slurry of ceramic material; removing surplus slurry and drying and heating the assembly to form a layer of fine-pored structure on the surface which was lined with absorbent material; applying a glazing frit to the layer of fine-pored structure; and heating to cause the frit to fuse and produce an impermeable facing.

5. A method as in claim 4 wherein the step of lining a surface of the ceramic foam article includes applying a slurry of fibres to said surface and removing liquid from the slurry.

6. A method as in claim 4 wherein the step of lining a surface of the ceramic foam article includes applying unsized paper to said surface.

7. A method of making a gas burner block which comprises forming a pattern of organic foam material in the shape of a block having one face constructed of finely pored foam, and having channels running across the block, lining the channels with absorbent material, impregnating the foam and absorbent material with a slurry of ceramic material, removing surplus slurry, drying and firing the block, providing the walls of the channels and at least one face of the block, with a fine-pored surface, applying a glaze from a slurry to the fine-pored face and the interior walls of the channels, and drying and firing the block to a temperature sufficient to fuse the glaze to an impermeable coating.

* * * * *